US009650976B2

(12) United States Patent
Gingrich et al.

(10) Patent No.: US 9,650,976 B2
(45) Date of Patent: May 16, 2017

(54) ENGINE FUEL CONTROL FOR INTERNAL COMBUSTION ENGINE HAVING DEDICATED EGR

(71) Applicant: Southwest Research Institute, San Antonio, TX (US)

(72) Inventors: Jess W. Gingrich, San Antonio, TX (US); Raphael Gukelberger, San Antonio, TX (US); Jacob R. Zuehl, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 562 days.

(21) Appl. No.: 14/173,247

(22) Filed: Feb. 5, 2014

(65) Prior Publication Data

US 2015/0219028 A1 Aug. 6, 2015

(51) Int. Cl.
| | |
|---|---|
| *F02B 47/08* | (2006.01) |
| *F02M 25/07* | (2006.01) |
| *G06F 7/00* | (2006.01) |
| *G06F 17/00* | (2006.01) |
| *F02D 41/00* | (2006.01) |
| *F02D 41/40* | (2006.01) |
| *F02M 26/43* | (2016.01) |
| *F02M 26/05* | (2016.01) |
| *F02M 26/35* | (2016.01) |

(52) U.S. Cl.
CPC ....... *F02D 41/0065* (2013.01); *F02D 41/008* (2013.01); *F02D 41/40* (2013.01); *F02M 26/05* (2016.02); *F02M 26/35* (2016.02); *F02M 26/43* (2016.02); *Y02T 10/44* (2013.01); *Y02T 10/47* (2013.01)

(58) Field of Classification Search
CPC .... F02D 41/0065; F02D 41/008; F02D 41/40; F02M 26/05; F02M 26/35; F02M 26/43; Y02T 10/47; Y02T 10/44
USPC .................. 123/445, 217, 672; 701/103, 108
See application file for complete search history.

(56) References Cited

U.S. PATENT DOCUMENTS

| | | | | | |
|---|---|---|---|---|---|
| 4,462,351 | A | * | 7/1984 | Fujii | F02D 17/02 123/198 F |
| 6,508,209 | B1 | * | 1/2003 | Collier, Jr. | F02B 43/00 123/3 |
| 8,899,016 | B2 | * | 12/2014 | Gingrich | F01N 3/101 123/568.11 |
| 9,109,545 | B2 | * | 8/2015 | Klingbeil | F02D 41/0085 |
| 9,194,307 | B2 | * | 11/2015 | Geckler | F02D 41/0065 |
| 9,528,406 | B2 | * | 12/2016 | Glugla | F02D 21/08 |
| 9,556,809 | B2 | * | 1/2017 | Klingbeil | F02D 19/061 |

(Continued)

*Primary Examiner* — David Hamaoui
(74) *Attorney, Agent, or Firm* — Livingston Law Firm

(57) ABSTRACT

A method of controlling the amount of fuel delivered to an engine having at least one dedicated EGR cylinder. The method is typically performed on an engine cycle-by-cycle basis. A fueling control unit receives, from the engine's main control unit, fueling requirement data representing a current fueling requirement suitable for the main cylinders. The fueling control unit then calculates a current amount of fuel to be delivered to the dedicated EGR cylinder as a function of the number of dedicated EGR cylinders, the number of main cylinders, the current equivalence ratio for the dedicated EGR cylinder, and the fueling requirement data. With the amounts of fuel for both the dedicated EGR cylinder and the main cylinders now having been determined, the fueling control unit generates appropriate control signals to the cylinder fuel delivery mechanisms.

20 Claims, 3 Drawing Sheets

(56) References Cited

U.S. PATENT DOCUMENTS

| | | | | |
|---|---|---|---|---|
| 2004/0065279 A1* | 4/2004 | Hitomi | F01L 1/267 | 123/58.8 |
| 2004/0168655 A1* | 9/2004 | Hitomi | F01L 1/185 | 123/58.8 |
| 2004/0168665 A1* | 9/2004 | Hori | F02B 23/104 | 123/179.5 |
| 2005/0193718 A1* | 9/2005 | Surnilla | F02D 41/0082 | 60/285 |
| 2005/0193988 A1* | 9/2005 | Bidner | F01L 13/00 | 123/481 |
| 2011/0289904 A1* | 12/2011 | Miyashita | F02M 26/43 | 60/278 |
| 2012/0078492 A1* | 3/2012 | Freund | F02D 41/0065 | 701/108 |
| 2012/0298070 A1* | 11/2012 | Akinyemi | F02D 41/0047 | 123/294 |
| 2012/0323465 A1* | 12/2012 | Peters | F02D 41/0082 | 701/104 |
| 2012/0323470 A1* | 12/2012 | Klingbeil | F02D 41/0065 | 701/108 |
| 2013/0030672 A1* | 1/2013 | Klingbeil | F02D 41/0085 | 701/109 |
| 2015/0219028 A1* | 8/2015 | Gingrich | F02M 26/43 | 123/445 |
| 2016/0069286 A1* | 3/2016 | Zielinski | F02D 41/0002 | 123/445 |
| 2016/0153375 A1* | 6/2016 | Klingbeil | F02D 41/0027 | 123/577 |
| 2016/0230712 A1* | 8/2016 | Akinyemi | F02M 26/43 | |
| 2016/0252027 A1* | 9/2016 | Jackson | F02D 41/0082 | 60/605.2 |

* cited by examiner

ENGINE FUEL CONTROL FOR INTERNAL COMBUSTION ENGINE HAVING DEDICATED EGR

TECHNICAL FIELD OF THE INVENTION

This invention relates to internal combustion engines, and more particularly such engines having dedicated EGR and to methods of controlling fuel delivered to the engine.

BACKGROUND OF THE INVENTION

For many internal combustion engines, their engine control strategy has three important parameters: spark timing (or fuel injection timing in a diesel engine), the exhaust gas recirculation (EGR) rate and the air/fuel ratio (AFR).

To implement EGR, a fraction of the exhaust gas is recycled from the exhaust system back to the intake system. The recirculated exhaust gas is mixed with the fresh fuel-air mixture before entering the cylinders. EGR can be implemented in internal and external configurations. External configurations can be implemented as either a high pressure or low pressure loop, depending on whether the recirculated exhaust is introduced to the intake post compressor (high pressure loop) or pre-compressor (low pressure loop).

EGR has a long history of use in both diesel and spark-ignited engines for reduction of NOx emissions. It affects combustion in several ways. The combustion is cooled by the presence of exhaust gas, that is, the recirculated exhaust gas absorbs heat. The dilution of the oxygen present in the combustion chamber reduces the production of NOx. Also, if exhaust gas is being recirculated, less air is breathed by the engine, so reducing the amount of exhaust gas produced.

One approach to implementing EGR is with one or more dedicated EGR cylinders. In a "dedicated EGR" engine, the one or more dedicated cylinders are used to generate exhaust gas, all of which is dedicated to recirculation. With dedicated EGR, the quality of the recirculated exhaust can be improved by increased in-cylinder reforming of gasoline to H2 and CO. Subsequent combustion of this exhaust by the engine is thereby enhanced.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
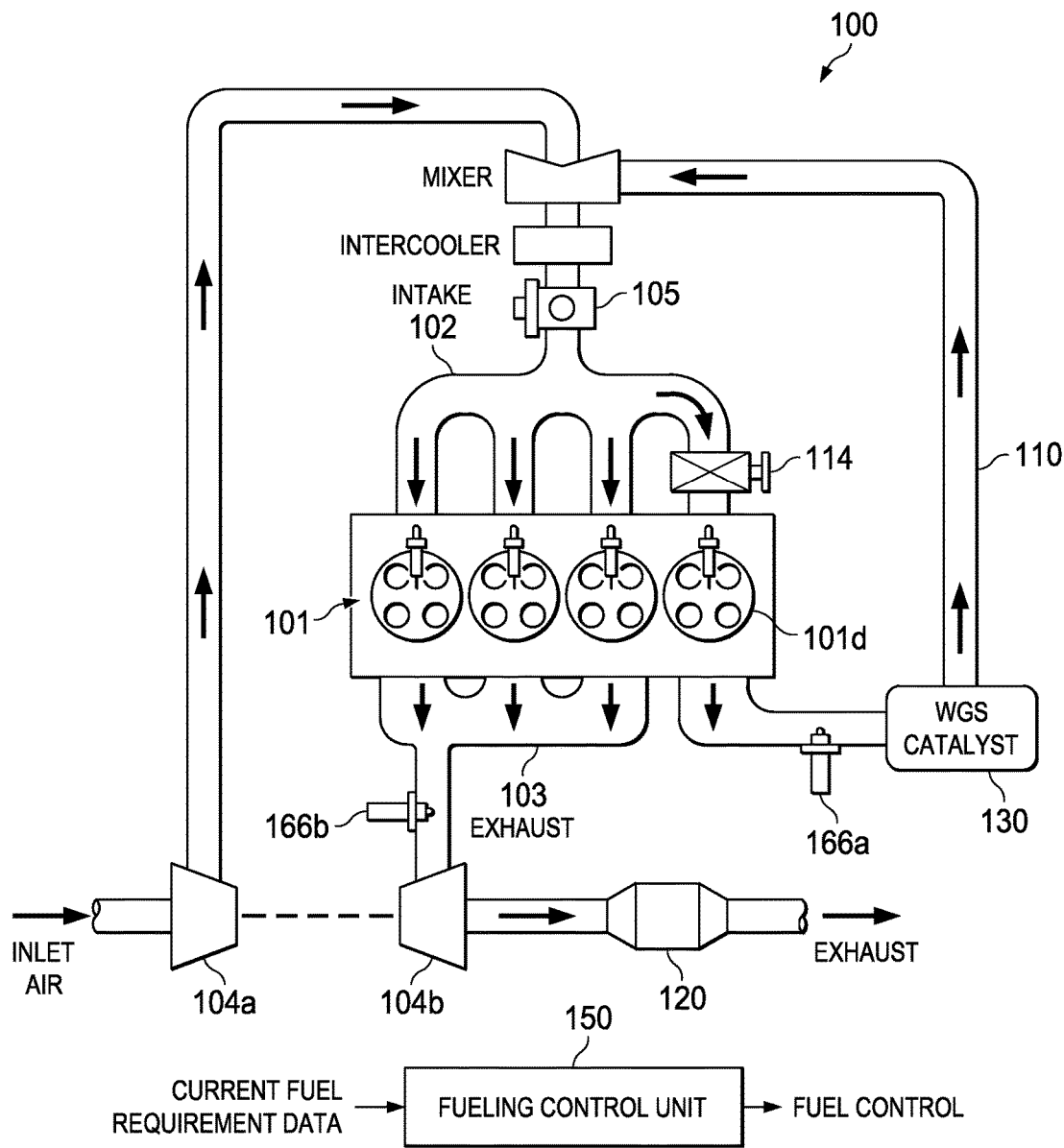
FIG. 1 illustrates an example of an internal combustion engine having a dedicated EGR cylinder.

The following description is directed to systems and methods for fueling an internal combustion engine having dedicated EGR. As stated in the Background, in a "dedicated EGR" engine, one or more of the engine's cylinders is used to generate exhaust gas to be recirculated to the intake charge of the entire engine.

The dedicated EGR may be produced by a cylinder having a single exhaust port that opens only to an EGR loop. The other cylinders produce "normal" exhaust, i.e., exhaust that exits the engine via one or more exhaust aftertreatment devices. U.S. Pat. No. 8,291,891, entitled "EGR System with Dedicated EGR Cylinders", to Alger, et al., and U.S. Pat. No. 8,561,599 entitled "EGR Distributor Apparatus for Dedicated EGR Configuration", to Gingrich et al., both describe systems that generate dedicated EGR in this manner and are incorporated by reference herein.

A feature of dedicated EGR is that the composition of the dedicated EGR exhaust gas may be controlled to be different from that of the exhaust of the non-dedicated cylinders. For example, the dedicated EGR cylinder(s) may be run rich to provide EGR that improves combustion on all cylinders.

The methods described herein integrate a dedicated EGR fueling strategy with a conventional engine control system. This integration is significant because in a dedicated EGR engine the dedicated and non dedicated cylinders may receive different amounts of fuel, whereas in a conventional engine the cylinders are typically fueled such that all cylinders receive the same amount.

The method provides a means to calculate and distribute fuel to multiple engine cylinders in a way that all cylinders operate at a target air-to-fuel ratio as the dedicated EGR quality is manipulated for optimum engine emissions, performance, and efficiency. For purposes of this description, there are four measures of fuel that describe the same process, but have individual utility for controlling the system based on the temporal resolution of the process. These measures are:

1) engine fuel flow (mass per time),
2) individual cylinder fuel flow (mass per time per cylinder),
3) cycle fuel mass (mass per cycle per cylinder), and
4) fuel injector pulse width defined in terms of the millisecond the injector is 'ON'. This measure is a translation of cycle fuel mass through a fuel delivery actuator based on calibration.

In a broad sense, the engine as a whole consumes fuel at a given rate, which can be calculated and used for control purposes when all cylinders operate uniformly. This value has units of mass per time.

However, in a dedicated EGR engine the cylinders can operate at different air-fuel ratios and the desired air-fuel ratio can change from cycle-to-cycle. Therefore, the average engine fuel flow requirement must be separated into fuel flow rates for each individual cylinder based on the dedicated EGR configuration and desired amount of reformate production. This quantity of fuel can be described as time-varying mass flow rates to each cylinder. Modern engines use fuel injectors to more precisely control the fuel flow rate to the engine. To control these injectors correctly, the mass flow rate to each cylinder is further reduced to the amount of fuel required for each cylinder every cycle. The metric at this level of control is the fuel mass per cycle. The fuel is not delivered evenly throughout the cycle. The control system only opens the injector when desirable and delivers the fuel during a finite period of the engine cycle. The "ON" time of the injector is proportional to the fuel mass delivered for the cycle. This "ON" time is typically on the order of milliseconds and describes as the pulsewidth of the injector.

Engine with Dedicated EGR Example

FIG. 1 illustrates an internal combustion engine 100 having four cylinders 101. One of the cylinders is a dedicated EGR cylinder, and is identified as cylinder 101*d*.

In the example of this description, engine 100 is spark ignited, with each cylinder 101 having an associated spark plug, and its "normal" air-fuel ratio is stoichiometric. However, the methods described herein are also suitable for use with compression ignited engines. In general, the engine's non-dedicated EGR cylinders 101 can be operated with whatever air-fuel ratio is appropriate for the engine.

The dedicated EGR cylinder 101d may be operated at any desired air-fuel ratio. All of its exhaust is recirculated back to the intake manifold 102. The exhaust of the other three cylinders 101 (referred to herein as the "main" or "non dedicated" cylinders) is directed to an exhaust system via an exhaust manifold 103.

Engine 100 is equipped with a turbocharger, specifically a compressor 104a and a turbine 104b. Although not explicitly shown, the cylinders have some sort of fuel delivery system for introducing fuel into the cylinders. This main fuel delivery system can be fumigated, port injected, or direct injected.

In the example of this description, the EGR line 110 joins the intake line downstream the compressor 104a. A throttle 105 is used to control the amount of intake (fresh air and EGR) into the intake manifold 102.

An EGR valve 114 may be used to control the intake into the EGR cylinder 101d. In other embodiments, other means, such as variable valve timing, may be used to control EGR flow.

In other embodiments, there may be a different number of engine cylinders 101, and/or there may be more than one dedicated EGR cylinder 101d. In general, in a dedicated EGR engine configuration, the exhaust of a sub-group of cylinders is routed back to the intake of all the cylinders, thereby providing EGR for all cylinders.

After entering the cylinders 101, the fresh-air/EGR mixture is ignited and combusts. After combustion, exhaust gas from each cylinder 101 flows through its exhaust port and into exhaust manifold 103. From the exhaust manifold 103, exhaust gas then flows through turbine 104b, which drives compressor 104a. After turbine 104b, exhaust gas flows to an exhaust aftertreatment device 120, to be treated before exiting to the atmosphere.

As stated above, the dedicated EGR cylinder 101d can operate at any equivalence ratio because its exhaust will not exit the engine before passing through a non-dedicated EGR cylinder 101 operating at a stoichiometric air-fuel ratio. Because only stoichiometric exhaust leaves the engine, the exhaust aftertreatment device 120 may be a three way catalyst. In embodiments in which the engine system is a lean burn system, the exhaust from the non dedicated ("main") EGR cylinders will pass through an appropriate exhaust aftertreatment device, such as a lean NOx trap, NOx adsorber or selective reduction catalyst.

To control the air-fuel ratio, exhaust gas may be sampled by an exhaust gas oxygen (EGO) sensor. Both the main exhaust line 122 and the EGR loop 110 may have a sensor (identified as 166a and 166b), particularly because the dedicated EGR cylinder may be operated at a different air-fuel ratio than non dedicated cylinders.

If a dedicated EGR cylinder is run rich of stoichiometric A/F ratio, a significant amount of hydrogen (H2) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as improving low speed peak torque results, due to increased EGR tolerance and the knock resistance provided by hydrogen (H2) and carbon monoxide (CO).

An EGR control unit 150 has appropriate hardware (processing and memory devices) and programming for performing the methods described herein. In addition, control unit 150 may perform other tasks, such as overall EGR control, and may be integrated with a comprehensive engine control unit. The inputs, processes, and outputs relevant to this description are described below in connection with FIG. 3.

Calculating Fuel Amount for Dedicated EGR Cylinders

Fueling for a dedicated EGR engine can be complicated. The fueling rate to the main cylinders is a function of the air entering the cylinder, the exhaust A/F sensor feedback, and the fuel entering the main cylinders from the dedicated EGR cylinder(s). The fuel entering the main cylinders from the dedicated EGR cylinder(s) is a function of the fuel reformed in the dedicated EGR cylinder(s) which is characterized by the equivalence ratio of the dedicated EGR cylinder.

With dedicated EGR, the fueling to the main cylinders may be stoichiometric or at some other equivalence ratio not the same as that of the dedicated EGR cylinders. The amount of fuel delivered to the main cylinders may be different from the amount of fuel delivered to the dedicated cylinders. This fuel distribution depends on a variable not present in a conventional engine, that is, the equivalence ratio in the dedicated EGR cylinder(s). This because the equivalence ratio in the dedicated EGR cylinder(s) affects the amount of H2 and CO (reformate) in the intake to all cylinders.

The dedicated EGR fueling control method described herein uses a conventional fuel control calculation in the engine control unit. The method modifies this calculation to determine how fuel should be distributed among all cylinders, based on a desired equivalence ratio in the dedicated EGR cylinders(s). The dedicated EGR equivalence ratio, or equivalently the intake reformate concentration, can be easily mapped based on the fuel composition.

This dedicated EGR fueling method is based on the recognition that controlling dedicated EGR fueling simply as an offset of the fueling to the main cylinders is insufficient. Controlling EGR fueling with an offset and UEGO feed back in the dedicated EGR circuit is also insufficient due to a variety of reasons. The ratio of fuel to the dedicated EGR cylinder to the fuel in the main cylinders is not constant, but is a function of the fuel to the dedicated EGR cylinder itself because reformate is routed back and consumed at later cycles displacing some fuel to maintain an overall exhaust tailpipe air-fuel ratio. The engine also becomes more efficient as the dedicated EGR cylinder produces more reformate so the engine fuel rate decreases.

For proper fueling control, a correlation was established between dedicated EGR cylinder and main cylinder mass flow rates as a function of the dedicated EGR cylinder equivalence ratio. In the example of this description, the engine is as depicted in FIG. 1, that is, a four cylinder engine with one dedicated EGR cylinder, and thus a nominally 25% recirculated EGR flow. The fuel mass flow to the dedicated EGR cylinder can be expressed as:

$$\dot{m}_{D\text{-}fuel} = \frac{(3*\Phi_{D\text{-}EGR} + 1)}{(5 - \Phi_{D\text{-}EGR})} * \dot{m}_{Main\text{-}fuel},$$

where $m_{D\text{-}fuel}$ is the fuel mass flow to the dedicated EGR cylinder, $m_{Main\text{-}fuel}$ is the fuel mass flow per main cylinder, and $\Phi_{D\text{-}EGR}$ is the equivalence ratio of the dedicated EGR cylinder.

This equation is referred to herein as the "dedicated EGR fuel mass flow equation". It can be derived for any dedicated EGR embodiment in a similar manner. The values 3 and 5 can are the same as n−d and n+d, where n is the total number of engine cylinders and d is the number of dedicated cylinders.

In general terms, the dedicated EGR fuel mass flow equation mathematically expresses the current amount of fuel to be delivered to the dedicated EGR cylinder(s) as a function of the number of dedicated EGR cylinders, the number of main cylinders, the current equivalence ratio for the dedicated EGR cylinder(s), and the fueling requirement data for one of the main cylinders.

Figure 2:
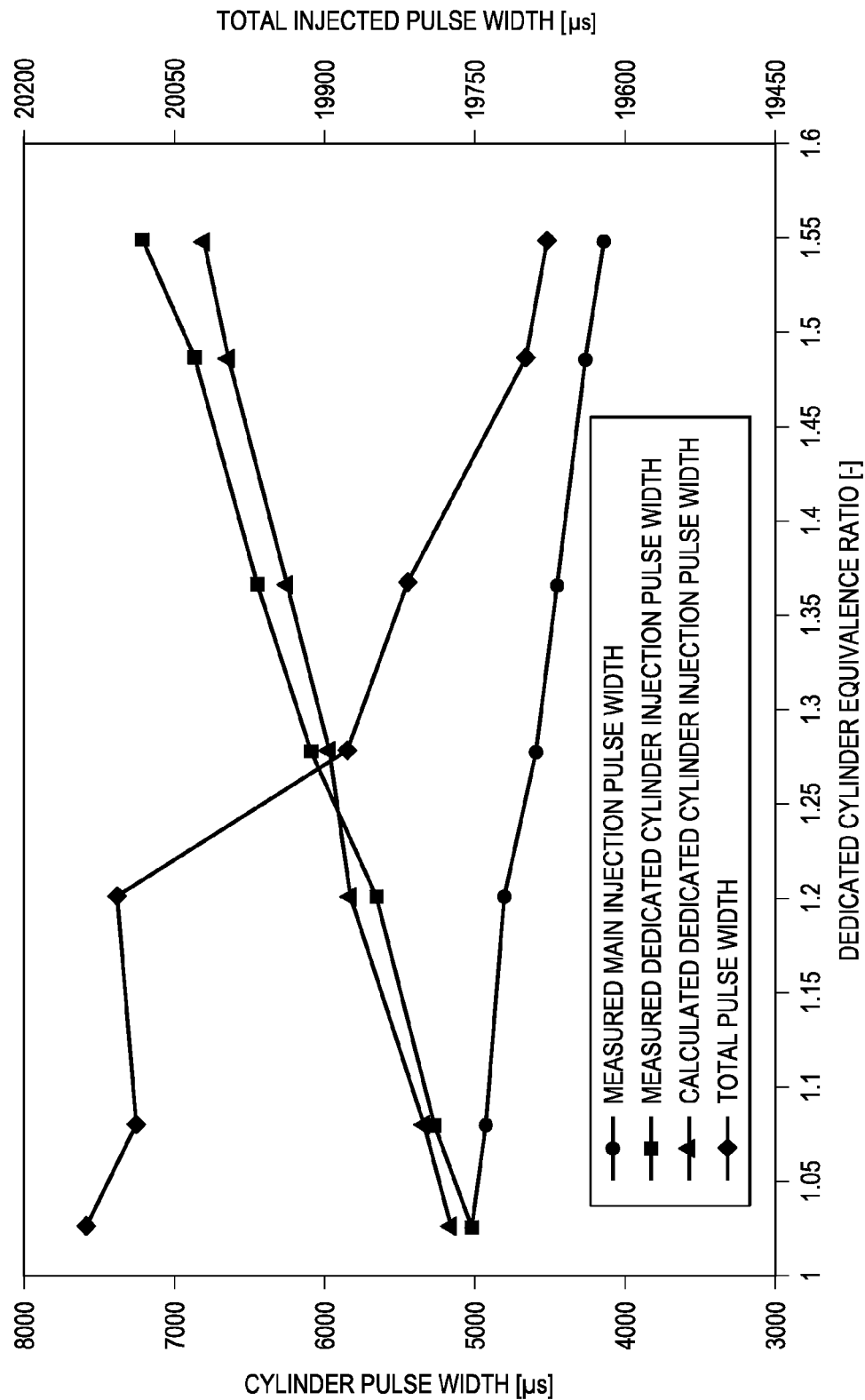
FIG. 2 illustrates, for the example engine of FIG. 1, cylinder injection pulse widths as a function of a desired equivalence ratio of the dedicated EGR cylinder.

FIG. 2 illustrates, for different equivalence ratios of the dedicated EGR cylinder, measured fuel injection pulse widths (PW) for the main and dedicated EGR cylinders. The total fuel injection pulse width is also shown (as a different scale on the right y axis). It can be seen that the total fuel injection pulse width is the same as the sum of three times the main fuel injection pulse width plus the dedicated fuel injection pulse width.

For comparison to the measured values, the above-described dedicated EGR fuel mass flow equation was used to calculate the dedicated EGR cylinder pulse width. The calculated values follow closely the measured values, up to the rich inflammability limit of approximately φD-EGR=1.55.

For these measurements, the above-described four cylinder engine was operated at 2000 rpm and 8.5 bar BMEP.

The main cylinder pulse width decreases gradually with increasing amounts of over fueling of the dedicated EGR cylinder. This is due to a considerable amount of re-circulated fuel energy coming from in-cylinder fuel reforming and products of incomplete combustion. The overall pulse width decreases with increasing dedicated cylinder equivalence ratios at a fixed operation condition because of the inherent efficiency improvement with dedicated EGR.

The above-described dedicated EGR fuel mass flow equation assumes that the fuel mass flow correlates with the fuel injection pulse width of the fuel injectors. This can be expected above a minimum injector mass flow. In modern engines, the ECU usually monitors and commands injector pulse widths based on calibration tables and air flow models.

Referring again to the above equation, it is possible to calculate the mass flow to each cylinder, dedicated EGR and main, from the output of an engine control unit. In the example of this description, this output is assumed to be a value representing a pulse width to be delivered to a fuel injector. As stated above, this pulse width value is easily correlated to the mass flow parameters of the equation.

However, the method is not limited to pulse width outputs for fuel injectors, and can be easily adapted to other engine control unit outputs for other fuel delivery mechanisms. The equation can be modified for energy content of the reformate verse base fuel, different fuel flow to injector pulse width transfer functions, etc.

Fuel Control Method for Engine with Dedicated EGR

Figure 3:
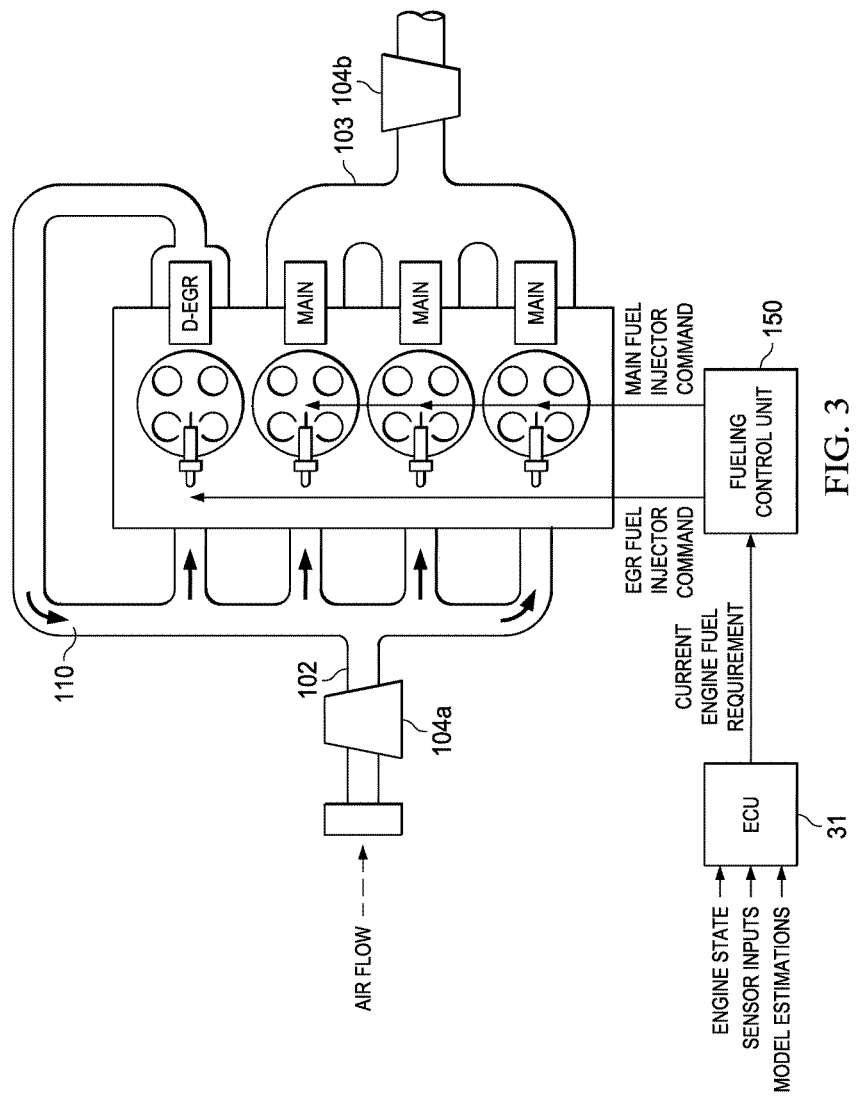
FIG. 3 illustrates a method of controlling fuel delivered to the cylinders of an engine having dedicated EGR.

FIG. 3 illustrates a method of fuel control for an engine having dedicated EGR. The method is implemented with a fueling control unit 150, which may be integrated with the engine control unit (ECU) 31, or may be a separate processing unit. The method is typically performed on a cycle-by-cycle basis, with new fueling amounts for the cylinders determined at each engine cycle.

The method of FIG. 3 is performed with appropriate programming of fueling control unit 150. It receives the input data discussed below. It processes these inputs, and delivers appropriate control signals to the cylinder fuel injectors. It stores appropriate data and algorithms for performing the processing. It is also assumed fueling control unit 150 is appropriately programmed to determine or access the desired equivalence ratio for the dedicated EGR cylinder(s), which may vary during engine operation.

The method is real time in the sense that it receives current fueling requirement data from the ECU, and allocates current fueling requirements among the cylinders. Typically, "current" data is data determined on an engine cycle-by-cycle basis.

The same example engine as in FIG. 1 is assumed, that is, having four cylinders and one dedicated EGR cylinder. The ECU 31 for the engine is also shown, and may be a conventional ECU whose functions include a conventional fuel flow control algorithm. The term "engine control unit" may equivalently include any control unit or process, whether the entire ECU or some subprocess, that provides the output discussed below.

A feature of the method is that conventional methods (or methods to be developed) for calculating total fuel per cycle for an engine are still used and achieved. In other words, the fueling control output of ECU 31 is delivered to fueling control unit 150. However, fueling control unit 150 adjusts the allocation of fuel amounts delivered per cylinder. This reallocation of fuel amounts per cylinder allows the main cylinders to remain stoichiometric while the dedicated EGR cylinder can be operated at another desired equivalence ratio.

More specifically, for every engine cycle, the ECU 31 calculates an amount of fuel to deliver to the cylinders. This amount may be expressed in various parameters, such as a fueling rate, a mass fuel amount, a fuel injector control pulse width. The fuel amount calculated by the ECU 31 may be described generally as "the instantaneous engine fuel requirement value".

Conventionally, the fueling rate is common to all engine cylinders. Thus, for a four cylinder engine such as illustrated in FIG. 3, the output of ECU 31 is a value representing the amount of fuel to be delivered to each of four cylinders. In a conventional engine, the total amount of fuel delivered to the engine would simply be four times this amount.

A first step of the method is receiving a current engine fueling requirement value from the engine control unit 31. This value represents, or provides the data for deriving, the average fuel mass flow rates required for each cylinder. This value is referred to herein as m(main).

Expressed mathematically, the total fuel delivered to a conventional engine per cycle (having no dedicated EGR cylinders) is:

$$m(\text{total}) = n*m(\text{main}),$$

where m(total) is a fuel mass delivered to the engine, m(main) is the fuel mass delivered per cylinder, and n is the number of engine cylinders.

For an engine having dedicated EGR cylinder(s), the fuel delivered to the dedicated EGR cylinder(s) may be different from the amount of fuel delivered to the main cylinders. Thus, for an engine having one dedicated EGR cylinder, the total fuel mass delivered to the engine may be expressed as:

$$m(\text{total}) = m(\text{EGR}) + (n-1)*m(\text{main})$$

The next step of the method is using the above-described equation to calculate m(EGR), the fuel to be delivered to the EGR cylinder(s). The calculation ensures that to correctly overfuel the dedicated EGR cylinder(s) and remain stoichiometric in the main cylinders, the fuel (reformate) that is recirculated in the EGR stream is accounted for. Given the ECU fuel requirement, the ratio of dedicated EGR fuel to main fuel, and the desired equivalence ratio of the dedicated EGR cylinder, the amount of fuel to be delivered to the dedicated cylinder can be calculated. Then, the fuel allocation for each cylinder, dedicated and main, is known.

The next step is delivering appropriate control signals to the fuel injectors. As indicated in FIG. 3, the injector(s) for the dedicated EGR cylinder(s) may receive different fuel control values than the injectors for the main cylinders. The calculated value of fuel per cycle for the main and dedicated cylinders can be translated into injector pulse widths based on calibration of the actuator, in terms of 'ON' time in milliseconds.

An advantage of the above-described fueling control method is that it accommodates the significant effort invested in transient fuel control for conventional engines. Those strategies are integrated with the specific requirements of a dedicated EGR engine for improved fuel allocation control, cycle-by-cycle transient control, and improved efficiency and emissions in a transient environment.

The method allocates fuel to the dedicated and main cylinders based on a reformate level that is optimized for efficiency and emissions. The feed forward fueling control strategy enables precise and immediate equivalence ratio control in the dedicated cylinder(s) during transients which results in greater EGR tolerance, improved knock mitigation, reduced emissions, increased efficiency, and quicker load and/or speed changes.

The desired dedicated EGR cylinder fuel per cycle is predicted without the shortcomings of using an UEGO sensor feedback in the dedicated EGR loop. The method allows accurate dedicated cylinder fueling control within one engine cycle resolution.

The method can be applied to any dedicated EGR engine where in-cylinder fuel reformation is occurring and routed back to all cylinders. Examples are a four cylinder engine with one dedicated EGR cylinder (25% nominal EGR), or a six cylinder engine with one or two dedicated EGR cylinders (16 or 33% EGR)

The method can be used with any target engine equivalence ratio, not only stoichiometric. It also can be applied to any fuel injection strategy, PFI, GDI, fumigated, or a combination of any or all. It can be integrated with cold start strategies. It can be used with engines utilizing variable valve trains. It can be used with naturally aspirated or boosted engines.

What is claimed is:

1. A method of controlling the amount of fuel delivered to an engine, the engine having at least one dedicated EGR cylinder with the remaining cylinders being main cylinders, each cylinder having at least one associated fuel injector, the engine further having an engine control unit:
   receiving, from the engine control unit, fueling requirement data representing a current fueling requirement amount for the main cylinders;
   calculating a current amount of fuel to be delivered to the at least one dedicated EGR cylinder as a product of a ratio that is a function of the number of dedicated EGR cylinders, the number of main cylinders, and the current equivalence ratio for the dedicated EGR cylinder, times the fueling requirement data;
   driving the fuel injector(s) associated with the at least one dedicated EGR cylinder by delivering a first set of control signals to the fuel injector(s) associated with the at least one dedicated EGR cylinder, the first set of control signals representing the current amount of fuel to be delivered to the at least one dedicated EGR cylinder;
   driving the fuel injectors associated with the main cylinders by delivering a second set of control signals to the fuel injectors of the main cylinders, the second set of control signals representing the fueling requirement data; and
   repeating the above steps during operation of the engine.

2. The method of claim 1, wherein the fueling requirement data represents a pulse width for controlling a fuel injector.

3. The method of claim 1, wherein the calculating step is performed by calculating a mass flow value, and further comprising the step of correlating the fueling requirement data to mass flow data.

4. The method of claim 1, wherein the repeating step is performed for each engine cycle.

5. The method of claim 1, wherein the dedicated EGR cylinder is operated at a different equivalence ratio than the main cylinders.

6. The method of claim 1, wherein the engine's main cylinders are run stoichiometrically.

7. The method of claim 1, wherein the engine's main cylinders are run rich.

8. The method of claim 1, wherein the engine's main cylinders are run lean.

9. The method of claim 1, wherein the engine is a spark ignited engine.

10. The method of claim 1, wherein the engine is a compression ignited engine.

11. An exhaust gas recirculation (EGR) system for an internal combustion engine having a number of cylinders, each cylinder having at least one associated fuel injector, and further having an engine control unit, comprising:
    one or more cylinders operable as a dedicated EGR cylinder, such that all of the exhaust produced by EGR cylinder(s), during all or some engine cycles, may be recirculated to the engine's main (non dedicated) cylinders;
    an EGR loop for recirculating EGR from the dedicated EGR cylinder(s) to the engine's intake manifold;
    a control unit programmed to perform the following tasks:
        receiving, from the engine control unit, fueling requirement data representing a current fueling requirement for the main cylinders;
        calculating a current amount of fuel to be delivered to the dedicated EGR cylinder(s) as a product of a ratio that is function of the number of dedicated EGR cylinders, the number of main cylinders, and the current equivalence ratio for the dedicated EGR cylinder(s), times the fueling requirement data;
        driving the fuel injector(s) associated with the at least one dedicated EGR cylinder by delivering a first set of control signals to the fuel injector(s) associated with the dedicated EGR cylinder(s), the first set of control signals representing the current amount of fuel to be delivered to the dedicated EGR cylinder(s);
        driving the fuel injector(s) associated with the main cylinders by delivering a second set of control signals to the fuel injectors associated with the main cylinders, the second set of control signals representing the fueling requirement data; and repeating the above steps during operation of the engine.

12. The system of claim 11, wherein the fueling requirement data represents a pulse width for controlling a fuel injector.

13. The system of claim 11, wherein the calculating step is performed by calculating a mass flow value, and further comprising the step of correlating the fueling requirement data to mass flow data.

14. The system of claim 11, wherein the repeating step is performed for each engine cycle.

15. The system of claim 11, wherein the dedicated EGR cylinder is operated at a different equivalence ratio than the main cylinders.

16. The system of claim 11, wherein the engine's main cylinders are run stoichiometrically.

17. The system of claim 11, wherein the engine's main cylinders are run rich.

18. The system of claim 11, wherein the engine's main cylinders are run lean.

19. The system of claim 11, wherein the engine is a spark ignited engine.

20. The system of claim 11, wherein the engine is a compression ignited engine.

* * * * *